United States Patent
Hsu

(10) Patent No.: US 9,632,346 B2
(45) Date of Patent: Apr. 25, 2017

(54) POLYMER-DISPERSED LIQUID CRYSTAL LIGHT-REGULATION STRUCTURE

(71) Applicant: CHEESHIN TECHNOLOGY CO., LTD., Miaoli County (TW)

(72) Inventor: Kuo-Chen Hsu, Miaoli County (TW)

(73) Assignee: CHEESHIN TECHNOLOGY CO., LTD., Miaoli County (TW)

(*) Notice: Subject to any disclaimer, the term of this patent is extended or adjusted under 35 U.S.C. 154(b) by 8 days.

(21) Appl. No.: 14/837,473

(22) Filed: Aug. 27, 2015

(65) Prior Publication Data
US 2017/0059901 A1    Mar. 2, 2017

(51) Int. Cl.
*G02F 1/1333* (2006.01)
*G02F 1/1334* (2006.01)
*G02F 1/137* (2006.01)
*G02B 5/20* (2006.01)

(52) U.S. Cl.
CPC ........... *G02F 1/1334* (2013.01); *G02B 5/208* (2013.01); *G02F 1/137* (2013.01); *G02F 1/133305* (2013.01)

(58) Field of Classification Search
CPC .. G02F 1/1334; G02F 1/133305; G02F 1/137; G02B 5/208
See application file for complete search history.

(56) References Cited

U.S. PATENT DOCUMENTS

| 2009/0051848 A1* | 2/2009 | Minoura ............... G02F 1/1335 349/62 |
| 2011/0027494 A1* | 2/2011 | Tan ..................... B29D 11/0074 427/508 |
| 2011/0169877 A1* | 7/2011 | Ishida .................. G02F 1/1334 345/690 |
| 2011/0255035 A1 | 10/2011 | Wu |
| 2013/0308075 A1* | 11/2013 | Watanabe ......... G02F 1/133308 349/61 |
| 2013/0321745 A1* | 12/2013 | Kubota ................. G02F 1/1334 349/86 |
| 2014/0374729 A1* | 12/2014 | Dobbertin ........... H01L 51/5253 257/40 |

* cited by examiner

*Primary Examiner* — Donald Raleigh
(74) *Attorney, Agent, or Firm* — Muncy, Geissler, Olds & Lowe, P.C.

(57) ABSTRACT

A polymer-dispersed liquid crystal light-regulation structure comprises a liquid crystal light-regulation layer, a first anti-infrared light-permeable conductive layer, a second anti-infrared light-permeable conductive layer, a first light-permeable substrate, and a second light-permeable substrate. The first and second anti-infrared light-permeable conductive layers are respectively disposed on two sides of the liquid crystal light-regulation layer. The first and second light-permeable substrates are respectively disposed on sides of the first and second anti-infrared light-permeable conductive layers, which are far away from the liquid crystal light-regulation layer. The first and second anti-infrared light-permeable conductive layers not only retard infrared light from entering the building and lower the indoor temperature but also function as electric-conduction structures electrically energized to vary the light transmittance of the liquid crystal light-regulation layer, whereby fewer layers are used in the present invention, and whereby is reduced the overall thickness of the present invention.

7 Claims, 4 Drawing Sheets

POLYMER-DISPERSED LIQUID CRYSTAL LIGHT-REGULATION STRUCTURE

FIELD OF THE INVENTION

The present invention relates to a light-regulation structure, particularly to a polymer-dispersed liquid crystal light-regulation structure.

BACKGROUND OF THE INVENTION

With advance of science and technology, windows are usually coated with tinted window films, or replaced with polymer-dispersed liquid crystal (PDLC) light-regulation membranes, low-emissivity glass or electrochromic glass, so as to retard excessive sunlight from entering buildings. The abovementioned four technologies respectively have their advantages and disadvantages. The PDLC light-regulation membrane and the electrochromic glass can vary the light transmittance thereof or even completely block light. Therefore, the two technologies can meet the demands of users for modern building windows. However, the PDLC membrane is superior to the electrochromic glass in cost and response speed and thus has higher potential to be massively used in building glass.

A U.S. patent publication No. 20110255035 disclosed a "Light-Regulation Membrane", which comprises a polymer-dispersed liquid crystal layer, a surface structure layer formed on one side of the polymer-dispersed liquid crystal layer, an adhesion layer formed on another side of the polymer-dispersed liquid crystal layer, which is far away from the surface structure layer, wherein the polymer-dispersed liquid crystal layer includes a liquid crystal layer; two conductive layers respectively founed on two sides of the liquid crystal layer; two first polymer layers respectively formed on two sides of the conductive layers, which are far away from the liquid crystal layers; two pressure-sensitive adhesion layers respectively formed on two sides of the first polymer layers, which are far away from the liquid crystal layers; and two second polymer layers respectively formed on two sides of the pressure-sensitive adhesion layers, which are far away from the liquid crystal layers. The light-regulation membrane can be stuck to transparent glass through the pressure-sensitive adhesion layers. An external electric field can be applied to the light-regulation membrane through the conductive layers for twisting the liquid crystal molecules and controlling light transmittance.

Although the polymer-dispersed liquid crystal layer can regulate the amount of the visible light entering the building, it cannot block infrared light that will increase the indoor temperature. While the user allows a great amount of sunlight to illuminate the indoor space, the indoor temperature will rise simultaneously. Thus, a device, such as an air conditioner, is needed to lower the indoor temperature with additional energy consumed. Therefore, how to acquire sufficient illumination and retard undesired infrared light simultaneously has been a target the manufacturers intend to achieve.

SUMMARY OF THE INVENTION

The primary objective of the present invention is to solve the problem that the conventional PDLC device cannot retard infrared light.

In order to achieve the abovementioned objective, the present invention proposes a polymer-dispersed liquid crystal light-regulation structure, which comprises a liquid crystal light-regulation layer, a first anti-infrared light-permeable conductive layer, a second anti-infrared light-permeable conductive layer, a first light-permeable substrate, and a second light-permeable substrate. The liquid crystal light-regulation layer includes a plurality of liquid crystals. The first anti-infrared light-permeable conductive layer and the second anti-infrared light-permeable conductive layer are respectively disposed on two sides of the liquid crystal light-regulation layer and include a nickel-chromium alloy. The first light-permeable substrate and the second light-permeable substrate are respectively disposed on one side of the first anti-infrared light-permeable conductive layer and one side of the second anti-infrared light-permeable conductive layer, which are far away from the liquid crystal light-regulation layer. While the first anti-infrared light-permeable conductive layer and the second anti-infrared light-permeable conductive layer are electrically energized, an external electric field is applied to the liquid crystal light-regulation layer and twists the liquid crystals, whereby the light transmittance of the liquid crystal light-regulation layer is varied.

In summary, the present invention has the following advantages:

1. Each of the first anti-infrared light-permeable conductive layer and the second anti-infrared light-permeable conductive layer integrates the functions of electric conduction and infrared blocking in a single layer. Therefore, the structure of the present invention has fewer layers, smaller thickness, and lower fabrication cost.
2. Both of the first anti-infrared light-permeable conductive layer and the second anti-infrared light-permeable conductive layer can retard infrared light from entering the building and lower the indoor temperature.

DETAILED DESCRIPTION OF THE PREFERRED EMBODIMENTS

The technical contents of the present invention will be described in detail in cooperation with drawings below.

Figure 1A:
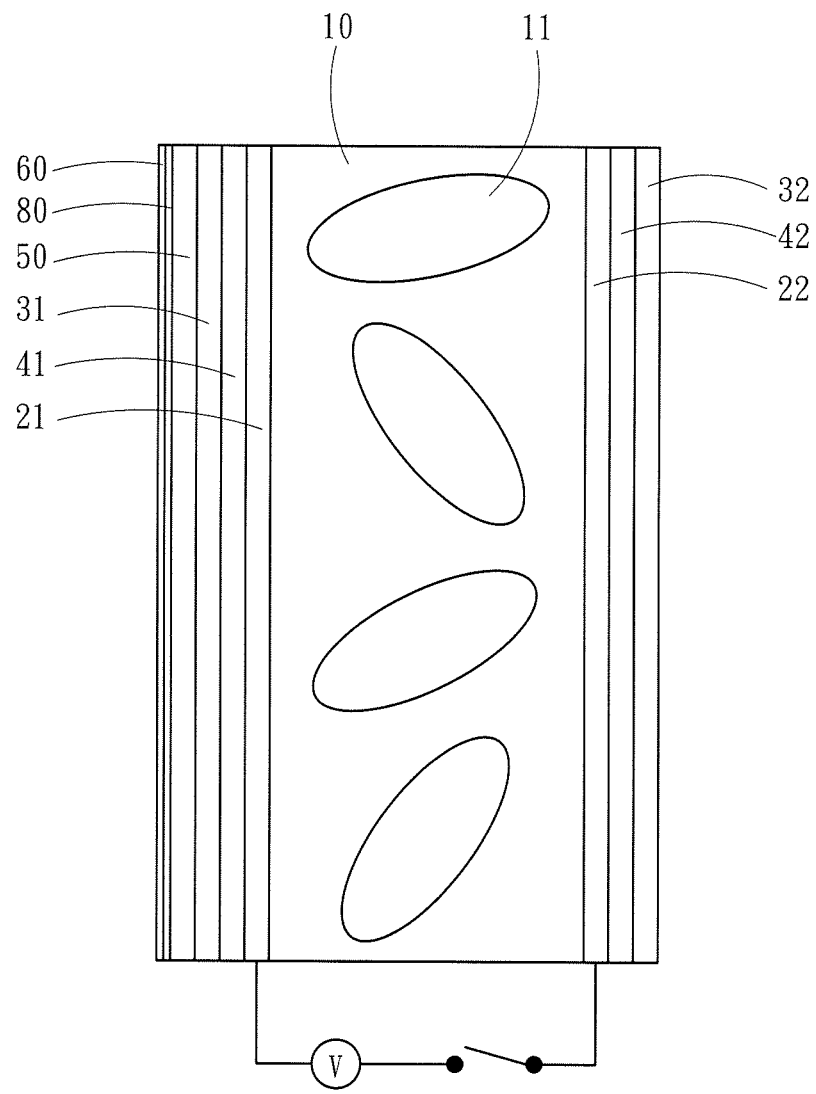
FIG. 1A is a diagram schematically showing a pre-energized polymer-dispersed liquid crystal light-regulation structure according to a first embodiment of the present invention.
Figure 1B:
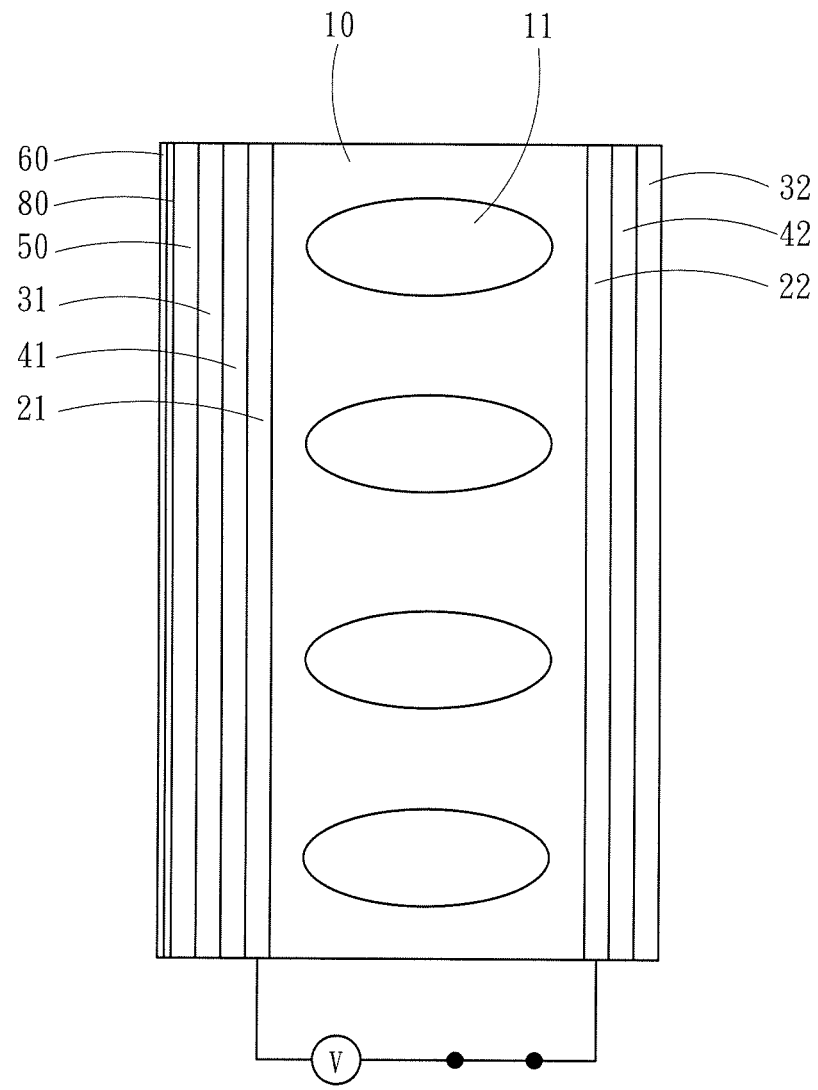
FIG. 1B is a diagram schematically showing an energized polymer-dispersed liquid crystal light-regulation structure according to the first embodiment of the present invention.

Refer to FIG. 1A and FIG. 1B for a first embodiment of the present invention. The present invention proposes a polymer-dispersed liquid crystal (PDLC) light-regulation structure, which comprises a liquid crystal light-regulation layer 10, a first anti-infrared light-permeable conductive layer 21, a second anti-infrared light-permeable conductive layer 22, a first light-permeable substrate 31, and a second light-permeable substrate 32. The liquid crystal light-regulation layer 10 includes a plurality of liquid crystals 11. The first anti-infrared light-permeable conductive layer 21 and the second anti-infrared light-permeable conductive layer 22 are respectively disposed on two sides of the liquid crystal light-regulation layer 10. The first light-permeable substrate 31 and the second light-permeable substrate 32 are respectively disposed on one side of the first anti-infrared light-permeable conductive layer 21 and one side of the second anti-infrared light-permeable conductive layer 22, which are far away from the liquid crystal light-regulation layer 10. The first anti-infrared light-permeable conductive layer 21 and the second anti-infrared light-permeable conductive layer 22 are made of a nickel-chromium alloy or an oxidized nickel-chromium alloy, which can retard infrared light from entering the building and reduce heat generated by infrared light. The color temperature of the polymer-dispersed liquid crystal light-regulation structure and the anti-infrared capability of the first anti-infrared light-permeable conductive layer 21 and the second anti-infrared light-permeable conductive layer 22 can be regulated via modifying the oxidization degree of the nickel-chromium alloy. The products of the present invention can be customized according to different requirements of users through regulating the color temperature of the present invention. For example, French windows of buildings, skylight windows of vehicles, and ordinary windows respectively require different color temperatures and different light shielding effects, and the present invention can achieve them via modifying the oxidization degree of the nickel-chromium alloy. Besides, the first anti-infrared light-permeable conductive layer 21 and the second anti-infrared light-permeable conductive layer 22 can simultaneously retard infrared light and conduct electricity, whereby the fabrication cost of the present invention is reduced and the thickness of the present invention is decreased.

The first light-permeable substrate 31 and the second light-permeable substrate 32 are made of a material selected from a group including polyethylene terephthalate (PET), polyethylene naphthalate (PEN), glass, polyimide, cyclic olefin copolymer (COC) and combinations thereof. In one embodiment, the first light-permeable substrate 31 and the second light-permeable substrate 32 are made of glass having a thickness of less than 0.3 mm and thus flexible. Therefore, the present invention can be fabricated in a roll-to-roll technology. Thus, the fabrication cost is reduced, and the productivity is increased.

In the first embodiment, the PDLC light-regulation structure of the present invention further comprises a first anti-oxidization protection layer 41 and a second anti-oxidization protection layer 42, an anti-ultraviolet layer 50, an adhesive layer 80 and a release layer 60. The first anti-oxidization protection layer 41 is disposed between the first anti-infrared light-permeable conductive layer 21 and the first light-permeable substrate 31; the second anti-oxidization protection layer 42 is disposed between the second anti-infrared light-permeable conductive layer 22 and the second light-permeable substrate 32. In one embodiment, the material of the first anti-oxidization protection layer 41 and the second anti-oxidization protection layer 42 includes titanium dioxide, which can protect the liquid crystal light-regulation layer 10 against oxygen and humidity and prolong the service life of the liquid crystal light-regulation layer 10. The anti-ultraviolet layer 50 is disposed on one side of the first light-permeable substrate 31, which is far away from the liquid crystal light-regulation layer 10. The anti-ultraviolet layer 50 can retard ultraviolet light from entering the building, protect human bodies from cytopathogenic effects caused by ultraviolet light, and prevent the liquid crystal light-regulation layer 10 from peeling off caused by long-term exposure to ultraviolet light. The adhesive layer 80 and the release layer 60 are sequentially disposed on one side of the anti-ultraviolet layer 50, which is far away from the first light-permeable substrate 31. After the release layer 60 is peeled off, the PDLC light-regulation structure can be stuck to the corresponding substrate with the adhesive layer 80.

While the first anti-infrared light-permeable conductive layer 21 and the second anti-infrared light-permeable conductive layer 22 are not electrically energized, the liquid crystals 11 orientate randomly and reflect the incident light, whereby the light transmittance of the liquid crystal light-regulation layer 10 is decreased. While the first anti-infrared light-permeable conductive layer 21 and the second anti-infrared light-permeable conductive layer 22 are electrically energized, an external electrical field is applied to the liquid crystal light-regulation layer 10 and twists the liquid crystals 11 to a specified orientation, whereby the light transmittance of the liquid crystal light-regulation layer 10 is increased. The twist angle and light transmittance of the liquid crystals 11 can be adjusted via inputting different voltages. In the first embodiment, the liquid crystals 11 are exemplified by normal-mode liquid crystals. However, the present invention does not limit that the liquid crystals 11 must be normal-mode liquid crystals. In the present invention, the liquid crystals 11 may also adopt reverse-mode liquid crystals, whose operation is exactly opposite to that of normal-mode liquid crystals. An electric field will decrease the light transmittance of the liquid crystal light-regulation layer 10 using reverse-mode liquid crystals; removal of the electric field will increase the light transmittance of the liquid crystal light-regulation layer 10 using reverse-mode liquid crystals.

Figure 2:
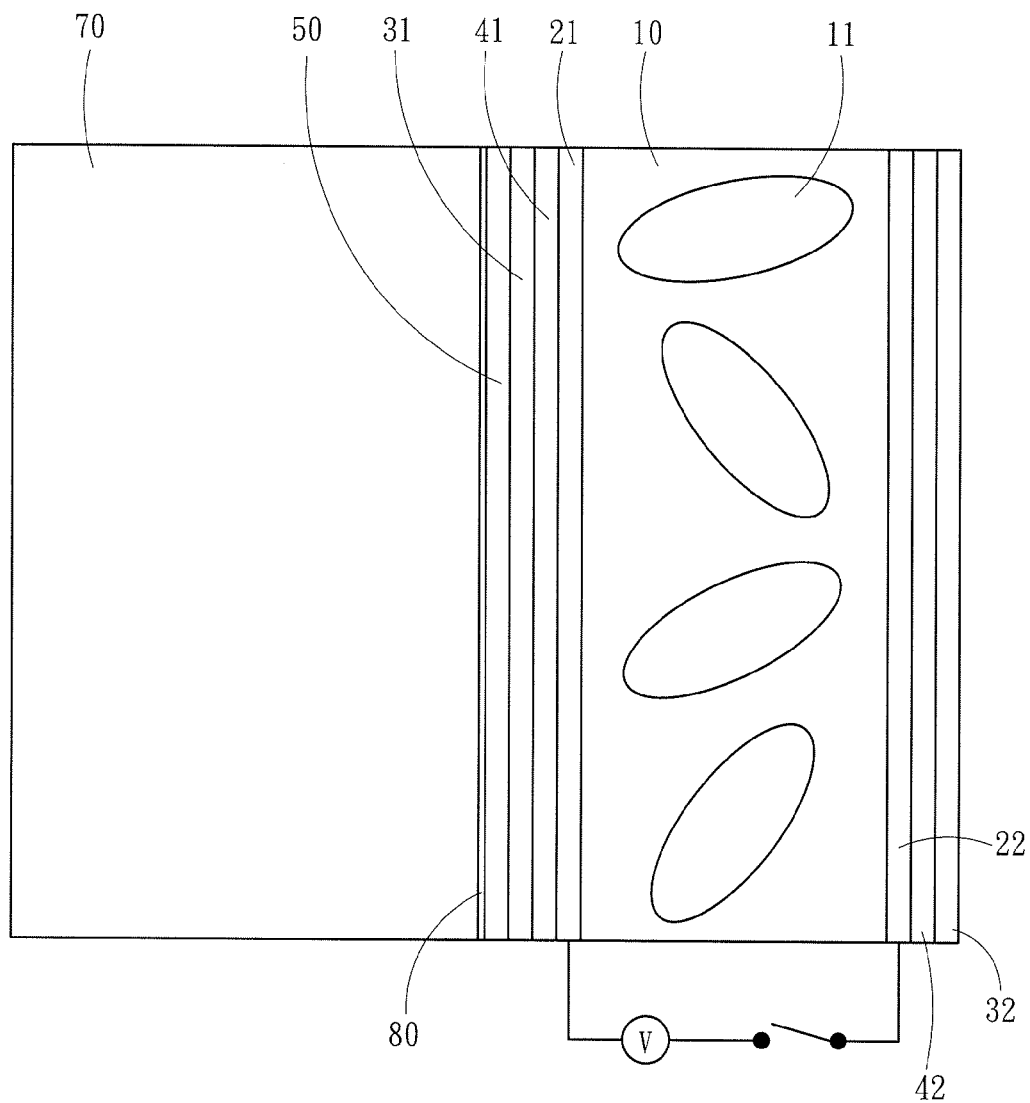
FIG. 2 is a diagram schematically showing an application of the polymer-dispersed liquid crystal light-regulation structure according to the first embodiment of the present invention.

Refer to FIG. 2. After the release layer 60 is peeled off, the PDLC light-regulation structure of the present invention can be stuck to a piece of glass 70 of a building or a location where illumination needs regulating. Then, the liquid crystal light-regulation layer 10 functions to control the light transmittance; the first anti-infrared light-permeable conductive layer 21 and the second anti-infrared light-permeable conductive layer 22 function to retard infrared light; the anti-ultraviolet layer 50 functions to retard ultraviolet light.

Figure 3:
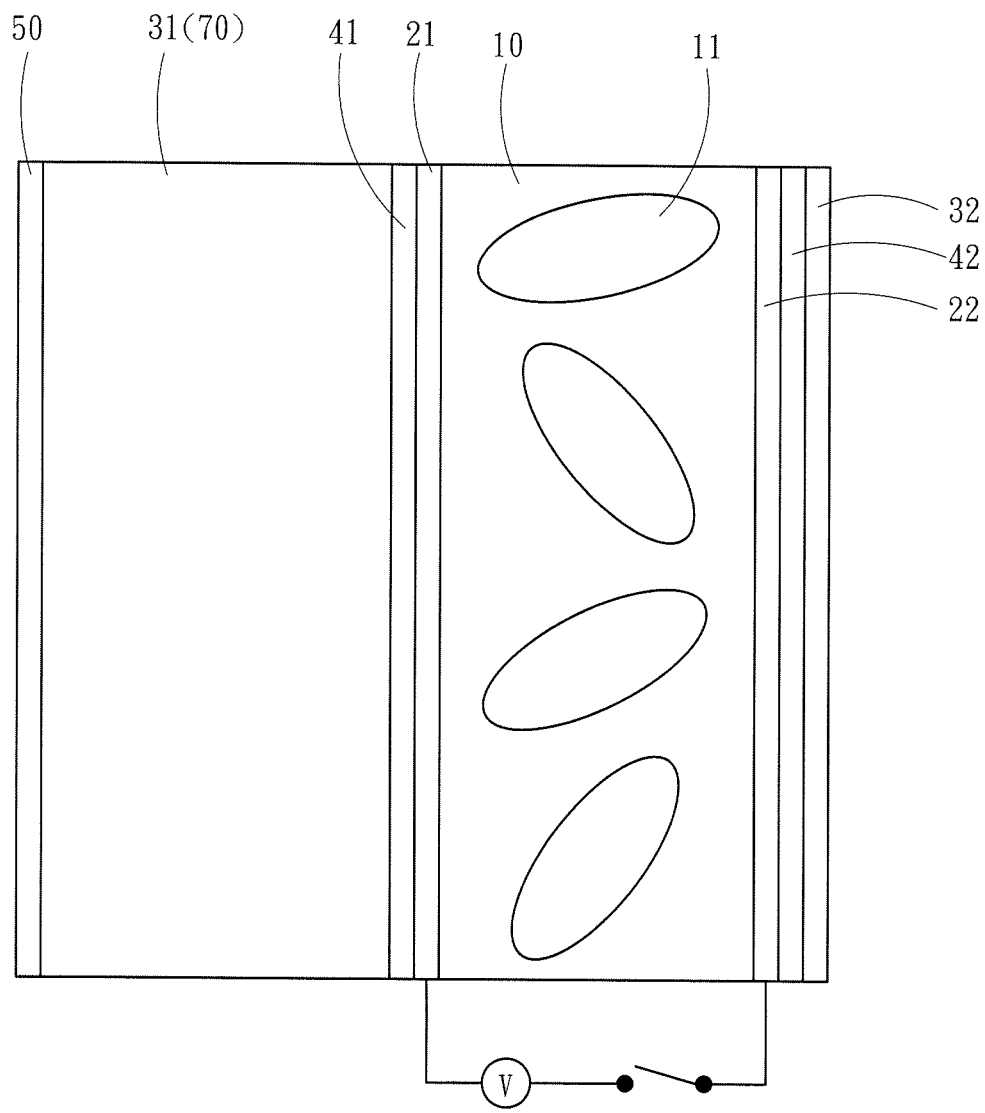
FIG. 3 is a diagram schematically showing an application of a polymer-dispersed liquid crystal light-regulation structure according to a second embodiment of the present invention.

Refer to FIG. 3 a diagram schematically showing an application of a PDLC light-regulation structure according to a second embodiment of the present invention. In the second embodiment, the first light-permeable substrate 31 is a piece of glass 70 of a building or a vehicle. Therefore, the release layer 60 is unnecessary in the second embodiment. The user may use appropriate methods to install and use the present invention according to practical conditions.

In conclusion, the present invention has the following characteristics:
1. The first anti-infrared light-permeable conductive layer and the second anti-infrared light-permeable conductive layer retard infrared light from entering the building and decrease heat generated by infrared light.
2. Each of the first anti-infrared light-permeable conductive layer and the second anti-infrared light-permeable conductive layer integrates the functions of retarding infrared light and conducting electricity in a single layer. Thereby is decreased the fabrication cost and reduced the overall thickness.
3. The color temperature of the PDLC light-regulation structure and the anti-infrared capability of the first anti-infrared light-permeable conductive layer and the second anti-infrared light-permeable conductive layer can be regulated via modifying the oxidization degree of the nickel-chromium alloy.

4. The first light-permeable substrate and the second light-permeable substrate are made of glass having a thickness of less than 0.3 mm and thus flexible. Therefore, the present invention can be fabricated in a roll-to-roll technology. Thus, the fabrication cost is reduced, and the productivity is increased.
5. The first anti-oxidization protection layer and the second anti-oxidization protection layer can protect the liquid crystal light-regulation layer against oxygen and humidity and prolong the service life of the liquid crystal light-regulation layer. The titanium dioxide of the first anti-oxidization protection layer and the second anti-oxidization protection layer can also enhance the anti-ultraviolet capability of the present invention.
6. The anti-ultraviolet layer can retard ultraviolet light from entering the building, protect human bodies from cytopathogenic effects caused by ultraviolet light, and prevent the liquid crystal light-regulation layer from peeling off caused by long-term exposure to ultraviolet light.

What is claimed is:

1. A polymer-dispersed liquid crystal light-regulation structure comprising:
   a liquid crystal light-regulation layer including a plurality of liquid crystals;
   a first anti-infrared light-permeable conductive layer and a second anti-infrared light-permeable conductive layer both including a nickel-chromium alloy and respectively disposed on two sides of the liquid crystal light-regulation layer;
   a first light-permeable substrate and a second light-permeable substrate respectively disposed on one side of the first anti-infrared light-permeable conductive layer and one side of the second anti-infrared light-permeable conductive layer, which are far away from the liquid crystal light-regulation layer;
   wherein the first anti-infrared light-permeable conductive layer and the second anti-infrared light-permeable conductive layer are electrically energized to generate an external electric field, which twists the liquid crystals and varies light transmittance of the liquid crystal light-regulation layer;
   wherein the first anti-infrared light-permeable conductive layer and the second anti-infrared light-permeable conductive layer are made of an oxidized nickel-chromium alloy.

2. The polymer-dispersed liquid crystal light-regulation structure according to claim 1 further comprising a first anti-oxidization protection layer disposed between the first anti-infrared light-permeable conductive layer and the first light-permeable substrate and a second anti-oxidization protection layer disposed between the second anti-infrared light-permeable conductive layer and the second light-permeable substrate.

3. The polymer-dispersed liquid crystal light-regulation structure according to claim 2, wherein the first anti-oxidization protection layer and the second anti-oxidization protection layer includes titanium dioxide.

4. The polymer-dispersed liquid crystal light-regulation structure according to claim 1 further comprising an anti-ultraviolet layer disposed on one side of the first light-permeable substrate, which is far away from the liquid crystal light-regulation layer.

5. The polymer-dispersed liquid crystal light-regulation structure according to claim 4 further comprising a release layer disposed on one side of the anti-ultraviolet layer, which is far away from the first light-permeable substrate.

6. The polymer-dispersed liquid crystal light-regulation structure according to claim 1, wherein the first light-permeable substrate and the second light-permeable substrate are made of a material selected from a group including polyethylene terephthalate (PET), polyethylene naphthalate (PEN), glass, polyimide, cyclic olefin copolymer (COC) and combinations thereof.

7. The polymer-dispersed liquid crystal light-regulation structure according to claim 6, wherein the first light-permeable substrate and the second light-permeable substrate are made of glass having a thickness of less than 0.3 mm.

* * * * *